June 3, 1930. C. C. RUNNER 1,761,748
VARIABLE SPEED MOTOR CONTROL APPARATUS
Filed May 29, 1926
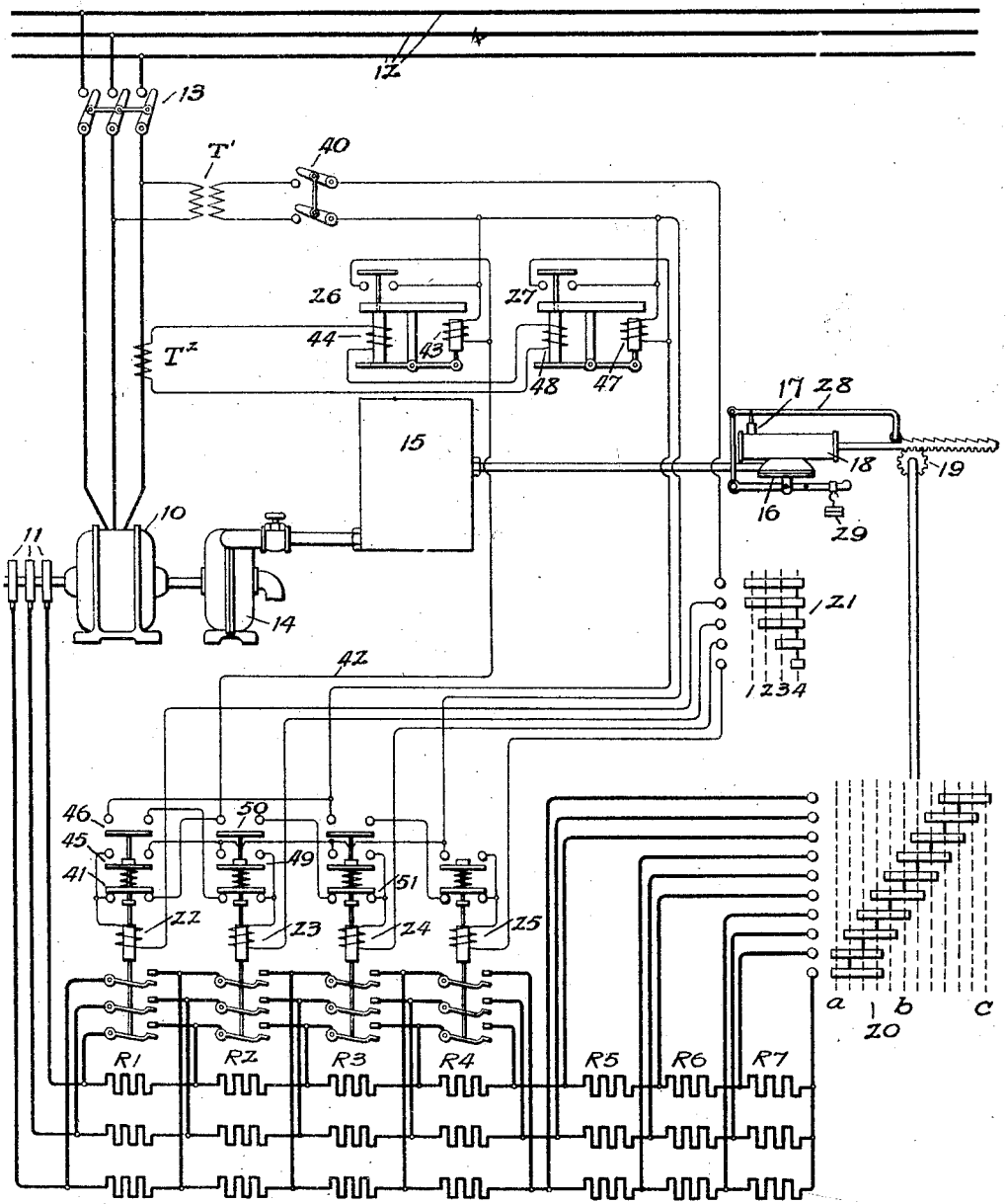
Inventor:
Claude C. Runner,
by *Alexander S. [signature]*
His Attorney.

Patented June 3, 1930

1,761,748

UNITED STATES PATENT OFFICE

CLAUDE C. RUNNER, OF SCHENECTADY, NEW YORK, ASSIGNOR TO GENERAL ELECTRIC COMPANY, A CORPORATION OF NEW YORK

VARIABLE-SPEED MOTOR-CONTROL APPARATUS

Application filed May 29, 1926. Serial No. 112,658.

This invention relates to the control of electric motors, particularly variable speed motors that are employed in pumping or other variable duty service, and are operated at each of a plurality of speeds under the control of an automatic device in accordance with varying service conditions.

One of the principal objects of the invention is to provide an improved control arrangement whereby the range of control of the operating speeds of the motor by the automatic device may be extended without in any way reducing the sensitivity or accuracy of control.

Where the operating speed of a motor is varied over any given range by means of an automatic device, the accuracy and sensitivity of control depend primarily upon the number of speed-control steps included between the limits of operation of the automatic device. However, with a maximum number of control steps included within the limits of operation of the automatic device so as to give accurate and sensitive control over the given range, it often is desirable to extend considerably the limits of speed variation of the motor without altering the accuracy or sensitivity of control. This may be accomplished in accordance with my invention by providing an independently operable speed-control means for the motor arranged to cooperate with the automatic device in controlling the speed of the motor so as to progressively shift the range of control of the automatic device between each pair of a consecutive series of limits.

In carrying my present invention into effect in a preferred form suitable for regulating the speed of an alternating current induction motor, I provide suitable speed regulating resistors in the secondary circuit of the motor and arrange switch mechanism to be operated by an automatic device in accordance with predetermined conditions, such for example as a pressure regulator, for controlling a portion of the motor speed regulating resistors in a relatively large number of steps so as to vary the motor speed in small increments over a limited range. Then, in order to extend the limits of control of the automatic device, I provide an independently operable speed controller for the motor that is arranged to control the remainder of the motor speed regulating resistor so as to progressively shift both the minimum and maximum limit of control of the automatic device through a consecutive series of values. In this way the automatic device is rendered capable of varying the motor speed between each pair of a consecutive series of limits with a maximum of sensitivity and accuracy of control in each range of control.

A more complete understanding of the invention may be had from the accompanying drawing in which the single figure diagrammatically illustrates a boiler feed pump motor control system embodying a preferred form of the invention.

In the drawing the motor 10 is shown as of the three phase alternating current induction type having the secondary or rotor windings thereof connected in circuit through the slip rings 11 with speed-regulating resistors having the sections $R^1$ to $R^7$. Power is supplied to the motor 10 from suitable three phase supply lines 12 through the line switch 13. The motor 10 is connected to drive the feed pump 14 which supplies feed water to the boiler 15.

The automatic control of the operating speed of the motor 10 is effected by means of the pressure diaphragm 16 which as diagrammatically shown is suitably connected to be responsive to variations in the steam pressure in boiler 15. The diaphragm 16 controls the valve mechanism 17 of the fluid pressure operating mechanism 18, which is connected through suitable rack and pinion gearing 19 to operate the controller 20. The controller 20 is connected to control the successive sections $R^5$, $R^6$, $R^7$, of the motor speed regulating resistor so as to vary the operating speed of the motor 10 in small increments over a predetermined range.

The manually operated controller 21 controls the energization of the electroresponsive switches 22, 23, 24, 25, which respectively control the short circuiting of the sections $R^1$ to $R^4$ of the motor speed regulating resistors. In this way the manually operable controller 21 cooperates with the automatically operated controller 20 to vary the limits of speed control of the automatic controller through a series of minimum and maximum values without altering the fine increments of control thereof between each pair of limits.

In order to provide for automatic acceleration of motor 10 to the operating speed determined by the joint operation of the controllers 20 and 21, the electroresponsive current limit relays 26 and 27 are connected to cooperate with the manual controller 21 to control the operation of the electroresponsive switches 22 to 25.

The operation of the control system illustrated is as follows: The line switch 13 first is closed to connect the motor 10 to the supply lines 12. In case it is desired to operate motor 10 between the minimum limits of the automatic controller 20, the manual controller 21 is left in the off position in which it is shown, thus insuring that all of the speed regulating resistor sections $R^1$ to $R^4$ are maintained in the secondary circuit of the motor. Under these conditions the automatic controller 20 is operated by the fluid pressure mechanism 18 to a position determined by the variations in boiler pressure exerted upon the diaphragm 16. The compensating lever 28 cooperates with the controlling diaphragm 16 in controlling the valve mechanism 17 so as to stop the controller after a limited movement thereof. Since the diaphragm controller pressure operating mechanism 18, together with the arrangement of the compensating lever 28, is old and well known in the pressure regulator art, no further detailed description thereof is deemed necessary.

As the controller 20 is operated under the control of the diaphragm 16, it is connected to successively short circuit the individual sections of resistance $R^7$, $R^6$, $R^5$, the particular number of sections short circuited at any time being determined by the pressure diaphragm 16 and the compensating lever 28. As long as the pressure on the diaphragm just balances the weight 29, the valve mechanism 17 operates to maintain the controller 20 stationary. Whenever the pressure on the diaphragm 16 varies, the controller 20 is operated to either insert or remove additional individual sections of the motor speed regulating resistors. In this way the automatically operated controller 20 is capable of varying the operating speed of motor 10 in small increments through a certain range within the limits of operation of the controller 20. However, when the controller 20 is operated to its last position C, all of the sections $R^5$, $R^6$, $R^7$, of the speed regulating resistor are removed from the motor circuit and the motor speed is increased from the minimum value to a certain higher value.

To extend the range of control of the automatically operated controller 20 over higher values of the motor speed, the manually operated controller 21 may be advanced into position 1. With the control disconnecting switch 40 closed, operation of the manual controller 21 into position 1 energizes the electroresponsive resistance controlling switch 22 through a circuit extending through a potential transformer $T^1$, the disconnecting switch 40, the upper two contacts of manual controller 21, the winding of switch 22, interlocking contact 41, conductor 42, the voltage responsive winding 43 of the relay 26, and thence through the disconnecting switch of the other transformer terminal. Thus the windings of switch 22 and of relay 26 are energized in series circuit and the current flow in the circuit maintained below the value required to operate switch 22. After the voltage winding 43 responds to lift its core or armature and thereby place the closure of the relay contacts under the control of the current responsive winding 44, winding 44 is energized in accordance with the line current of the motor 10 by means of the current transformer $T^2$. When the motor current is below a certain value the energization of winding 44 is insufficient to maintain the contacts of the relay in the open position. As soon as the relay contact is closed, the voltage winding 43 is short circuited, thereby increasing the energization of switch 22 to the full value. Switch 22 at once responds to short circuit the section $R^1$ of the speed regulating resistors to increase the operating speed of the motor 10. The automatic controller 20 now is capable of varying the operating speed of motor 10 between new minimum and maximum speed limits that are higher than when the section $R^1$ of the speed regulating resistors was included in the motor circuit. Preferably the sections of resistance $R^1$, $R^2$, $R^3$, $R^4$, are so proportioned that the minimum and maximum limits of speed control by the automatic controller 20 are varied through substantially a consecutive or arithmetical series of values. Thus to further increase the range of control of the automatic controller 20 to still higher motor speeds, the manual controller 21 may be advanced to any one of the positions 2, 3, 4, to successively effect operation of the electroresponsive switches 23, 24, 25 to short circuit the corresponding sections $R^2$, $R^3$, $R^4$, of the speed controlling resistor. Operation of the switches 23 and 25 is under the control of the current limit relay 27 which functions in substantially the same manner as the relay 26 to effect operation of the switches controlled thereby. The switch 24 is under the control of the current limit relay 26.

Thus it will be seen that in position 4 the manual controller 21 effects the short circuiting of all of the sections $R^1$ to $R^4$ of the speed regulating resistor and thereby increases the range of control of the automatic controller 20 to the maximum or short circuited secondary speed of the induction motor 10. By thus varying the range of the automatic controller 20 a very fine and sensitive graduation in the control of the motor speed by the automatic controller is possible since the automatic controller is capable of varying the motor speed in small increments through each of the speed ranges.

In case the line disconnecting switch 13 is closed to start operation of motor 10 with the automatic controller 20 and the manual controller 21 in any of their operative positions, the automatic current limit relays 26 and 27 serve to automatically control the acceleration of motor 10 as in the following manner. Assume the manual controller 21 in position 3 and that the automatic controller 20 in its position $b$ to short circuit the sections $R^6$, $R^7$, of the speed regulating resistor, closure of the line switch 13 establishes power connections for the motor 10 with the sections $R^1$ to $R^5$ of the speed regulating resistor in the secondary circuit of the motor. Thereupon the resistance controlling switch 22 is placed under the control of the current limit switch 26 in the manner previously described, the control circuit extending from the potential transformer $T^1$ through the control disconnecting switch 40, the upper two contacts of the manual controller 21, the winding of switch 22, contact 41, the voltage responsive winding 43 of the relay 26, and thence to the other terminal of the potential transformer. When the voltage responsive winding 43 raises its armature to close the relay contact under the control of the current winding 44, the winding 44 is energized from the current transformer $T^2$ in accordance with the line current of motor 10. As long as the acceleration of motor 10 results in a line current of large value the current winding 44 maintains the relay contact in the open position. However, as the motor accelerates to the normal speed with the resistors $R^1$ to $R^5$ in the secondary circuit, the motor line current decreases and the energization of the current winding 44 from the transformer $T^2$ is reduced sufficiently to permit the relay contacts to close. Thereupon the voltage responsive winding 43 is short circuited to impress full operating voltage upon the switch 22. The latter responds to short circuit the section $R^1$ of the speed-regulating resistor. At once the motor 10 starts to accelerate to a higher speed.

The closure of switch 22 completes a holding circuit for the operating winding thereof through the contact 45 entirely independently of the current limit relay 26 and the contact 46 is closed to place the operation of switch 23 under the control of the current limit relay 27. The voltage and current responsive windings 47 and 48 cooperate to effect closure of the relay contact when the motor accelerating current again decreases to normal value in exactly the same manner as described in connection with relay 26. Thus, the operating winding of switch 23 is finally energized and the switch closed to short circuit the section $R^2$ of the speed regulating resistor. The closure of contacts 49 and 50 of switch 23 respectively establishes an independent holding circuit for the operating winding of the switch and a circuit through which the current limit relay 26 controls the closure of switch 24, this circuit extending through the upper four contacts of the manual controller 21 and the contact 51 of switch 24. Relay 26 again functions in the same manner as previously described to restrain operation of switch 24 until after the motor accelerating current has decreased to normal value. Thus it will be seen that the current limit relays 26 and 27 cooperate to automatically control the acceleration of motor 10 to an operating speed jointly determined by the position of the automatic controller 20 and the manual controller 21. The variation in the operating speed of motor 10 is under the control of the automatic controller 20 within its range of operation as determined by the setting of the manual controller 21. The various practical advantages of flexibility and accuracy, as well as automatic acceleration of motor 10, provided by my improved control system, will be evident to those skilled in the art.

What I claim as new and desire to secure by Letters Patent of the United States, is:

1. The combination with a variable speed electric motor, of automatic means responsive to predetermined conditions for controlling the speed of the motor to maintain different normal operating speeds varying in accordance with said predetermined conditions between each pair of a consecutive series of predetermined maximum and minimum speed limits, and independently operable means cooperating with said first means to determine the limits of control thereof.

2. The combination with a variable speed electric motor, of automatic means for increasing and decreasing the normal operating speed of the motor to different values within a limited range in accordance with predetermined conditions, and independently operable speed controlling means for the motor cooperating with said first means to shift said range of control of said first means between each pair of a consecutive series of minimum and maximum limits.

3. The combination with a variable speed electric motor and a speed controlling resistor therefor, of automatic means responsive to predetermined conditions for controlling said resistor to control the speed of the motor to maintain different normal operating speeds varying in accordance with said predetermined conditions between predetermined maximum and minimum speed limits, and independently operable means cooperating with said first means to vary said minimum and maximum limits of speed control of said first means through substantially an arithmetical series of values.

4. The combination with a variable speed electric motor, of a speed regulating resistor therefor, automatic means for controlling a portion of said resistor to control the speed of the motor to maintain different operating speeds varying in accordance with said predetermined conditions over a limited range, and independently operable means for controlling a different portion of said resistor to shift the range of control of said first means between each pair of a consecutive series of limits.

5. The combination with a variable speed electric motor, of a speed controlling resistor for said motor, a controller connected to control a portion of said resistor and arranged to be operated automatically in accordance with predetermined conditions to vary the operating speed of the motor over a limited range, and an independently operable controller connected to control the remaining portion of said resistor to successively shift either limit of control of the automatic controller to substantially the value of the other limit of control and thereby progressively shift the range of control of the automatic controller.

6. The combination with an alternating current induction motor having speed regulating resistors connected in the secondary circuit thereof, of a controller connected to control a portion of said resistors to control the speed of the motor to maintain different normal operating speeds varying in accordance with predetermined conditions over a limited range, automatic means for operating said controller in response to said predetermined conditions, and means including a manually operated controller for controlling the remaining portion of said resistors to vary the range of speed control of said automatically operated controller throughout the limits of said resistors.

7. The combination with a variable speed electric motor, of automatic means for varying the operating speed of the motor over a limited range in accordance with predetermined conditions, independently operable speed controlling means for the motor cooperating with said first means to progressively vary the range of control of the first means between an adjoining series of limits, and electroresponsive means cooperating with said speed controlling means to control the acceleration of the motor to the operating speed determined by said automatic means.

8. The combination with an alternating current induction motor having speed regulating resistors connected in the secondary circuit thereof, of a controller connected to control a portion of said resistors to vary the operating speed of the motor between predetermined limits, automatic means for operating said controller in response to predetermined conditions, means including a manually operated controller for controlling the remaining portion of said resistors to vary the limits of speed control of said automatically operated controller, and electroresponsive switch mechanism connected to cooperate with said manually operated controller for automatically accelerating the motor to the speed determined by said first controller in accordance with an electrical characteristic of the motor.

In witness whereof, I have hereunto set my hand this 27th day of May, 1926.

CLAUDE C. RUNNER.